(12) United States Patent
Kimura

(10) Patent No.: US 6,810,444 B2
(45) Date of Patent: Oct. 26, 2004

(54) MEMORY SYSTEM ALLOWING FAST OPERATION OF PROCESSOR WHILE USING FLASH MEMORY INCAPABLE OF RANDOM ACCESS

(75) Inventor: Masatoshi Kimura, Hyogo (JP)

(73) Assignee: Renesas Technology Corp., Tokyo (JP)

(*) Notice: Subject to any disclaimer, the term of this patent is extended or adjusted under 35 U.S.C. 154(b) by 0 days.

(21) Appl. No.: 10/372,099

(22) Filed: Feb. 25, 2003

(65) Prior Publication Data

US 2004/0064606 A1 Apr. 1, 2004

(30) Foreign Application Priority Data

Sep. 26, 2002 (JP) .................................. 2002-281209

(51) Int. Cl.[7] ............................ G06F 13/16; G06F 13/28
(52) U.S. Cl. ............................ 710/27; 710/35; 710/66; 710/71; 711/103; 711/165
(58) Field of Search ............................ 710/22, 23, 27, 710/33, 35, 66, 71; 711/100, 101, 103, 165

(56) References Cited

U.S. PATENT DOCUMENTS

| | | | | |
|---|---|---|---|---|
| 4,467,420 A | * | 8/1984 | Murakami et al. ............ | 710/23 |
| 5,784,592 A | * | 7/1998 | Gulick et al. ............ | 710/300 |
| 5,848,367 A | * | 12/1998 | Lotocky et al. ............ | 701/36 |
| 5,944,800 A | * | 8/1999 | Mattheis et al. ............ | 710/23 |
| 6,412,048 B1 | * | 6/2002 | Chauvel et al. ............ | 711/158 |
| 6,480,418 B2 | * | 11/2002 | Tanaka et al. ............ | 365/185.13 |
| 6,693,836 B2 | * | 2/2004 | Keeth et al. ............ | 365/221 |

FOREIGN PATENT DOCUMENTS

| | | |
|---|---|---|
| JP | 11-316716 | 11/1999 |
| JP | 11-345194 | 12/1999 |
| JP | P2001-25053 A | 1/2001 |

OTHER PUBLICATIONS

MultimediaCard Association Jun. 1999.
U.S. Related patent application Ser. No. 09/514,369 filed Feb. 28, 2000, (49657–625).

* cited by examiner

Primary Examiner—Rehana Perveen
(74) Attorney, Agent, or Firm—McDermott Will & Emery LLP

(57) ABSTRACT

A DMA control circuit controls DMA transfer between a flash memory and a main memory. An S/P bus conversion circuit converts serial data output from the flash memory into parallel data and outputs the parallel data to the main memory. This eliminates the need for the CPU downloading file data from the flash memory to the main memory, allowing connection of a non-volatile memory with a large capacity, without reduction in the processing speed of the system.

8 Claims, 13 Drawing Sheets

EXAMPLE OF INTERNAL BASIC CONFIGURATION OF PORTABLE TELEPHONE

MEMORY SYSTEM ALLOWING FAST OPERATION OF PROCESSOR WHILE USING FLASH MEMORY INCAPABLE OF RANDOM ACCESS

BACKGROUND OF THE INVENTION

1. Field of the Invention

The present invention relates to a memory system used in a portable telephone, a PDA (Personal Digital Assistant) or the like, and particularly, to a memory system that allows fast operation of a CPU (Central Processing Unit) or an MPU (Micro Processing Unit) while using an AND-type or NAND-type flash memory with a large capacity incapable of random access.

2. Description of the Background Art

In recent years, machines such as portable telephones, PDAs, information appliances and the like have become widespread. When a memory with a large capacity is required in such a machine for being adapted to i-mode, for transmission/reception of a digital camera image, for transmission/reception of moving images and the like, a flash memory with a large capacity is often connected to the machine.

FIG. 1 is a block diagram showing an example of a schematic configuration of a memory system in a conventional portable telephone. The portable telephone includes a CPU 104 performing general control of the portable telephone, a RAM/ROM 108 and an NOR-type flash memory 111 connected to an internal bus 103, a DRAM (Dynamic Random Access Memory) 110 connected to external buses 100 to 102, and a bus switch circuit 105 switching buses between external buses 100 to 102 and internal bus 103.

NOR-type flash memory 111 stores a program code executed by CPU 104. CPU 104 can access RAM/ROM 108 connected to internal bus 103 and DRAM 110 connected to external buses 100 to 102 at a high speed.

When a memory with a capacity much larger than that of NOR-type flash memory 111 is required, a memory system 112 is connected to external buses 100 to 102 in the portable telephone. Memory system 112 includes a control circuit 113 performing general control of memory system 112, and an AND-type or NAND-type flash memory 114 with a large capacity.

Flash memory 114 is capable of serial reading or serial writing of data sector by sector (one sector being, for example, 512 bytes or 1024 bytes) in synchronization with a serial clock, so that it is suitable for file storage.

Control circuit 113 has functions of generating a sector/column address of flash memory 114, performing serial/parallel bus conversion, and generating a serial clock.

When CPU 104 accesses flash memory 114 via external buses 100 to 102, address decoder 123 decodes an address output from CPU 104. Control circuit 113 receives the result of decoding by address decoder 123, interprets a command sent from CPU 104 via external buses 100 to 102, generates a required sector/column address, and accesses flash memory 114.

When CPU 104 reads data from flash memory 114, control circuit 113 converts serial data output from flash memory 114 into parallel data, and outputs the parallel data to external data bus 100 via a parallel bus. Moreover, when CPU 104 writes data into flash memory 114, control circuit 113 converts the parallel data output from CPU 104 into serial data, and outputs the serial data to flash memory 114 via a serial bus.

The data read from flash memory 114 is stored into RAM 108, DRAM 110 and the like, and can be accessed by CPU 104 at a high speed.

FIG. 2 is a block diagram showing another example of a schematic configuration of a memory system in the conventional portable telephone. The portable telephone is configured as in the portable telephone shown in FIG. 1, so that detailed description thereof will not be repeated.

A memory system 115 is formed by a card for file storage such as a compact flash (R) card or an ATA (AT Attachment) card, and includes a controller LSI (Large Scale Integrated circuit) 116 controlling the entire memory system, and an AND-type or NAND-type flash memory 114.

Controller LSI 116 has a function of generating a sector/column address of flash memory 114, a serial-parallel converting function, and a function of interpreting a command from CPU 104.

When CPU 104 accesses flash memory 114 via external buses 100 to 102, it issues a command indicating reading or writing of data to controller LSI 116. Controller LSI 116 interprets the command received from CPU 104, and controls flash memory 114 in accordance with the command.

FIG. 3 is a block diagram showing a further example of a schematic configuration of a memory system in the conventional portable telephone. The portable telephone is configured as in the portable telephone shown in FIG. 1, so that detailed description thereof will not be repeated.

A memory system 118 is formed by a card for file storage such as a memory stick of a serial bus type performing transmission/reception with serial data, a secure digital (SD) card, or a multimedia card (MMC), and includes a controller LSI 119 controlling the entire memory system and an AND-type or NAND-type flash memory 114.

Controller LSI 119 has a function of generating a sector/column address of flash memory 114, a function of interpreting a command from CPU 104 and the like.

When CPU 104 accesses flash memory 114 via external buses 100 to 102, it issues a command indicating reading or writing of data to controller LSI 119. An S/P (Serial/Parallel) bus conversion circuit 120 converts the command received from CPU 104 into serial data, and outputs the serial data to controller LSI 119.

Controller LSI 119 interprets the command of serial data received from S/P bus conversion circuit 120 and controls flash memory 114 in accordance with the command.

Moreover, a technique related to the above includes inventions disclosed in Japanese Patent Laying-Open No. 11-316716 and Japanese Patent Laying-Open No. 11-345194.

According to the memory control method disclosed in Japanese Patent Laying-Open No. 11-316716, data is transferred from a buffer memory to the flash ROM (Read Only Memory) by DMA (Direct Memory Access) transfer at writing the data into a flash ROM, to increase the speed of memory transfer.

Further, according to the portable telephone disclosed in Japanese Patent Laying-Open No. 11-345194, in response to an instruction sent by a CPU to a DSP (Digital Signal Processor) when a prescribed event occurs, the DSP performs DMA transfer of an application program on a rewritable external ROM such as a flash memory to an integrated RAM for the DSP to execute the application program, allowing correction/updating of the application program without the need for changing the DSP.

In the portable telephone shown in FIG. 1, control circuit 113 converts the serial data received from flash memory 114 via a serial bus into parallel data and outputs the parallel data onto a parallel bus, so that the transfer rate is determined by the rate of bus conversion, resulting in approximately a tenth the rate required by external buses 100 to 102 in general. Thus, memory system 112 directly connected to external buses 100 to 102 could not serve as a main memory of the portable telephone, causing a problem of lowered processing speed.

In addition, external buses 100 to 102 are occupied by data transfer during reading of data from flash memory 114, significantly lowering the bus efficiency and causing large overhead.

Moreover, in the portable telephone shown in FIG. 2, controller LSI 116 receives a command from CPU 104, interprets the command, and then converts the serial data received from flash memory 114 via a serial bus into parallel data to be output onto the parallel bus, causing a problem similar to that in the portable telephone shown in FIG. 1.

Further, in the portable telephone shown in FIG. 3, controller LSI 119 receives a command of serial data from S/P bus conversion circuit 120, interprets the command, and inputs the serial data from flash memory 114 via the serial bus. Thereafter, S/P bus conversion circuit 120 converts the serial data received from controller LSI 119 into parallel data and outputs the parallel data onto the parallel bus, causing a problem similar to that in the portable telephone shown in FIG. 1.

Moreover, the memory capacity within each of the portable telephones shown in FIGS. 1 to 3 may be increased without connection to memory system 112, 115 or 118, to accommodate increase of applications and the like. This, however, significantly increases the price compared to the case with an AND-type or NAND-type flash memory, and also increases the mounting area associated with the increase of the memory capacity.

Furthermore, according to the memory control method disclosed in Japanese Patent Laying-Open No. 11-316716, data is transferred from a buffer memory to a flash ROM by the DMA transfer, which however is not a technique for increasing the speed of an application.

In addition, according to the portable telephone disclosed in Japanese Patent Laying-Open No. 11-345194, the DSP is tightly coupled with the flash memory, so that access to the flash memory by the CPU is limited to a certain degree during the DMA transfer of data from the flash memory to the RAM in the DSP, also providing a limitation for enhancement of the processing speed of the portable telephone. Furthermore, while a randomly accessible flash memory is required as a precondition, the configuration above cannot achieve an increased capacity of a memory.

SUMMARY OF THE INVENTION

An object of the present invention is to provide a memory system that can be connected to a non-volatile memory with a large capacity while maintaining a processing speed of a system.

According to one aspect of the present invention, a memory system includes a non-volatile memory, a main memory connected to an external bus to which a processor is connected, a transfer control portion controlling direct memory access transfer between the non-volatile memory and the main memory, and a bus conversion portion performing conversion between parallel data and serial data between the non-volatile memory and the main memory.

The transfer control portion transfers data from the non-volatile memory that is converted into parallel data by the bus conversion portion to the main memory, eliminating the need for the processor downloading file data from the non-volatile memory to the main memory, allowing connection to a non-volatile memory with a large capacity without lowering of the processing speed of the system.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
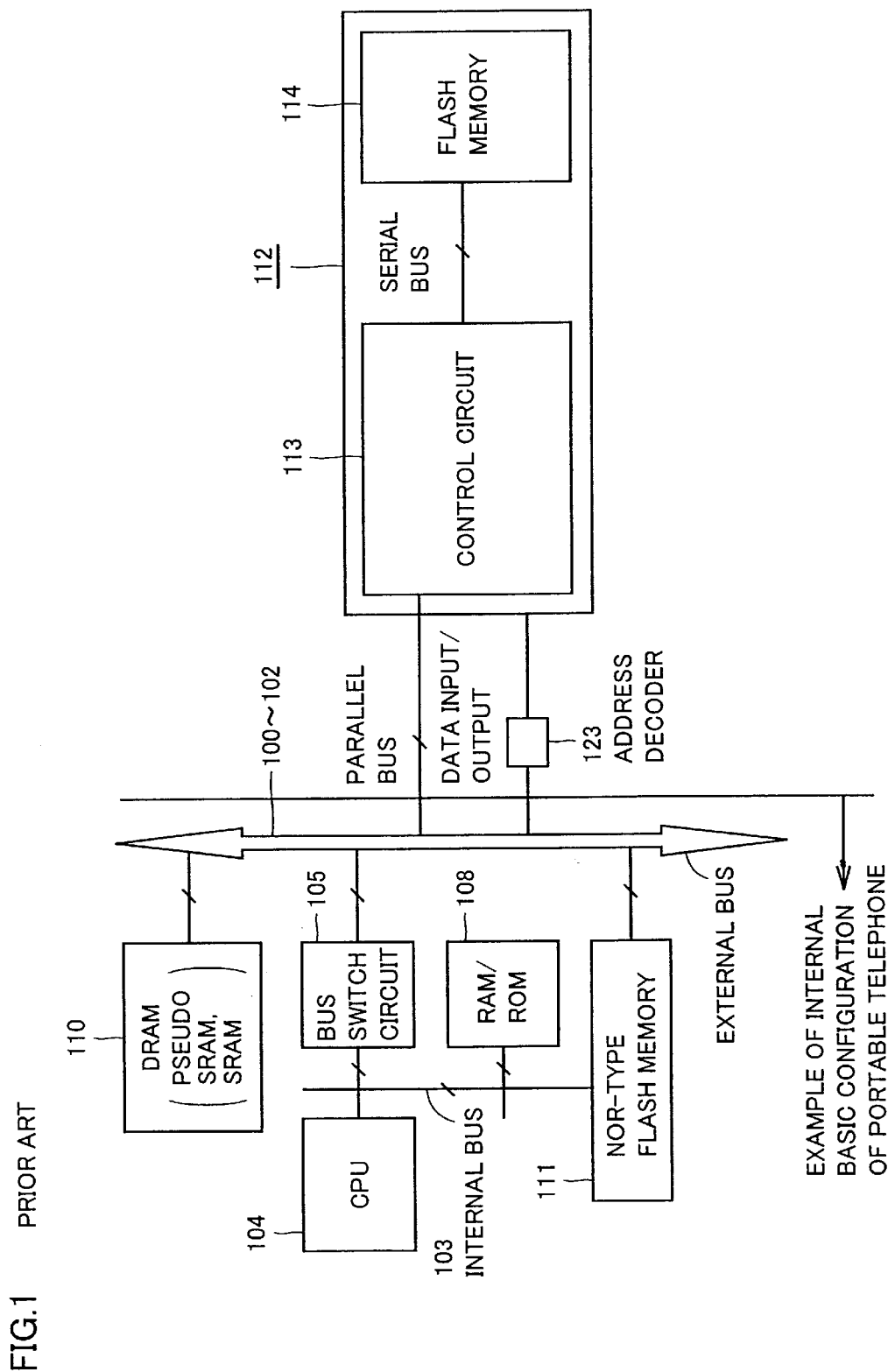
FIG. 1 is a block diagram showing an example of a schematic configuration of a memory system in the conventional portable telephone.
Figure 2:
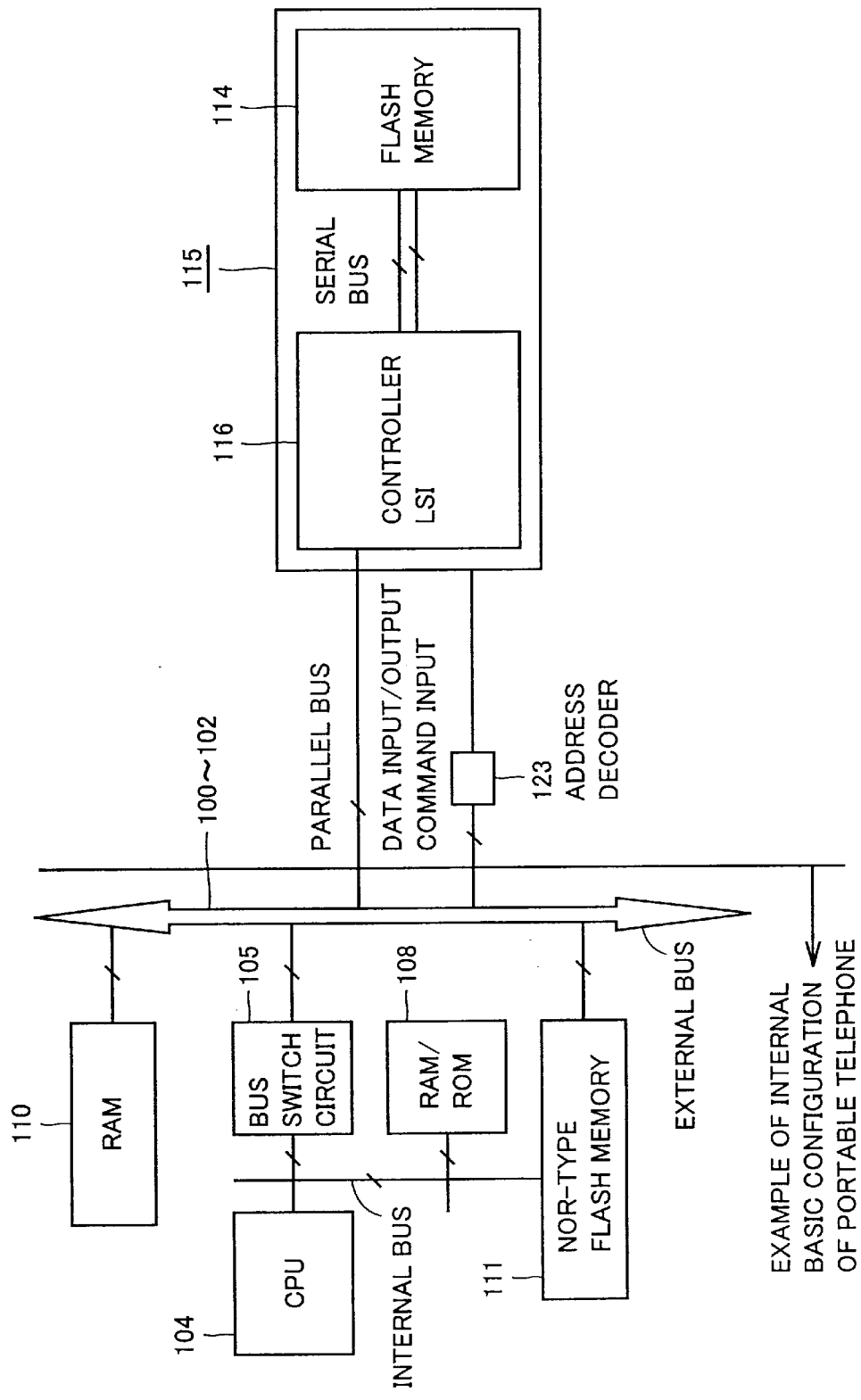
FIG. 2 is a block diagram showing another example of a schematic configuration of a memory system in the conventional portable telephone.
Figure 3:
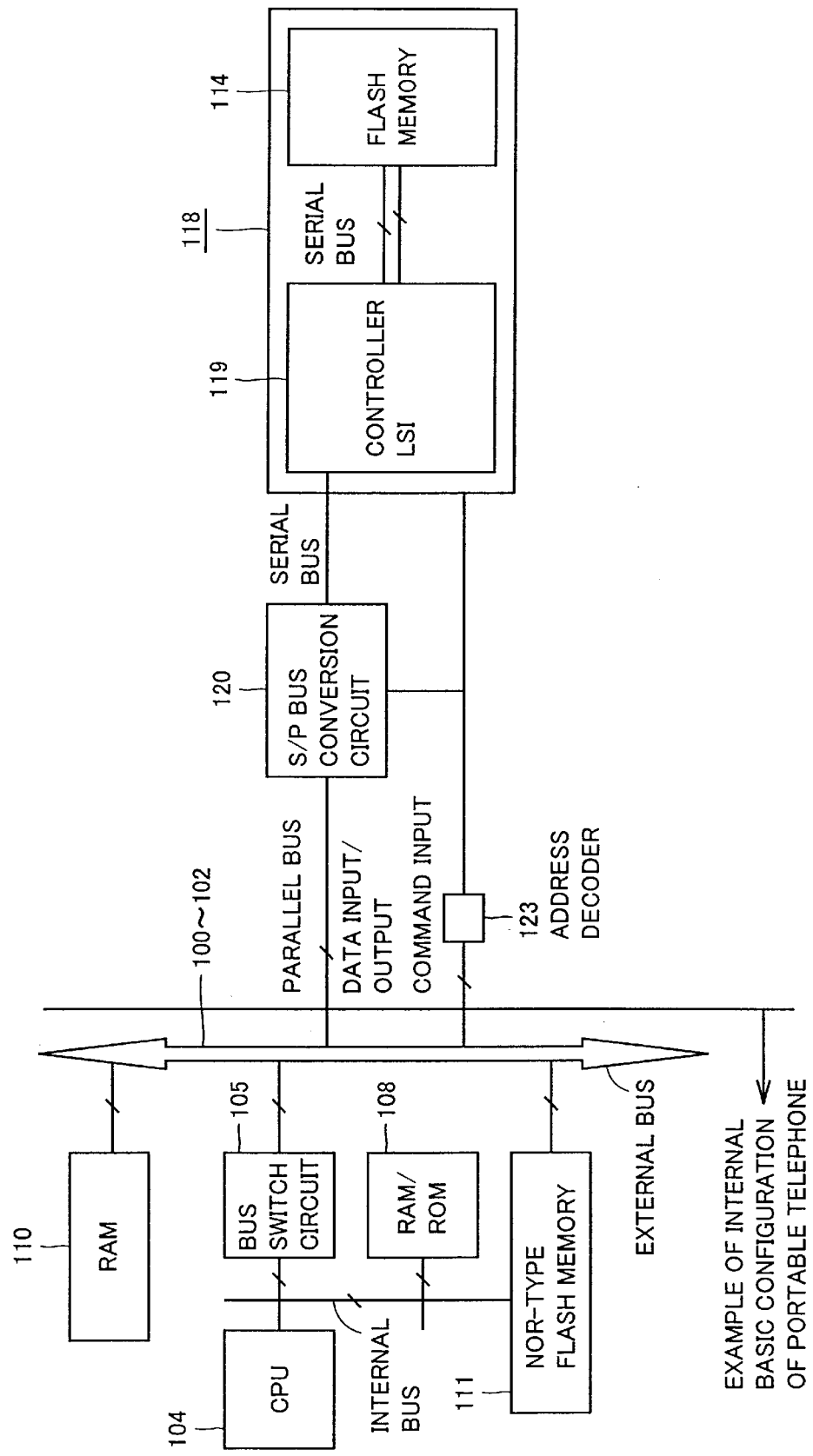
FIG. 3 is a block diagram showing a further example of a schematic configuration of the memory system in the conventional portable telephone.
Figure 4:
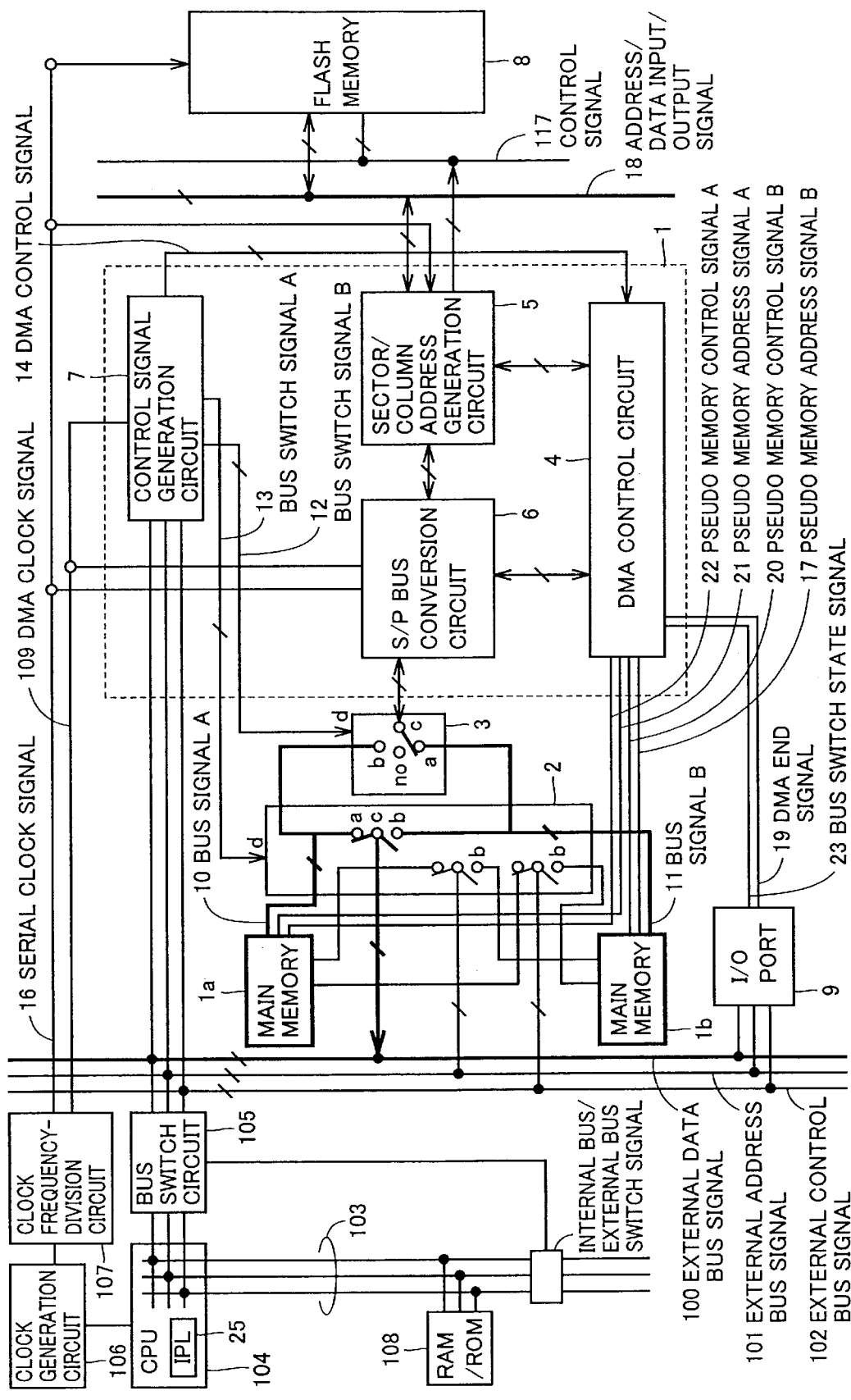
FIG. 4 is a block diagram showing a schematic configuration of a memory system in a portable telephone according to the first embodiment of the present invention.

FIG. 4 is a block diagram showing a schematic configuration of a memory system in a portable telephone according to the first embodiment of the present invention. The memory system includes a control portion 1, main memories 1a and 1b, bus switch circuits 2 and 3, an AND-type or NAND-type flash memory 8, an I/O (Input/Output) port 9, a CPU 104, a bus switch circuit 105, a clock generation circuit 106, a clock frequency-division circuit 107, and a RAM/ROM 108. It is noted that the same parts as in the configuration of the conventional memory system are denoted by the same reference characters.

Control circuit 1 includes a DMA control circuit 4 controlling DMA transfer between main memories 1a, 1b and flash memory 8, a sector/column address generation circuit 5 generating a sector/column address output to flash memory 8, an S/P bus conversion circuit 6 converting serial data received from flash memory 8 into parallel data to output the parallel data to main memory 1a or 1b and converting parallel data received from main memory 1a or 1b into serial data to output the serial data to flash memory 8, and a control signal generation circuit 7 for controlling the entire control circuit 1.

When control signal generation circuit 7 receives a command including a transfer file name, a header address of data to be accessed in flash memory 8, the number of transferred sectors (the number of transferred bytes) and the like from CPU 104 via bus switch circuit 105 and external buses 100 to 102, it interprets the received command and outputs a bus switch signal A 13 for controlling bus switch circuit 2 switching buses, a bus switch signal B 12 for controlling bus switch circuit 3 switching buses, and a DMA control signal 14 for controlling DMA control circuit 4.

When DMA control circuit 4 receives DMA control signal 14 from control signal generation circuit 7, it starts DMA transfer between main memory 1a or 1b and flash memory 8. At the DMA transfer between main memory 1a and flash memory 8, DMA control circuit 4 outputs a pseudo memory address signal A 21 and a pseudo memory control signal A 22 to main memory 1a, and outputs an address corresponding to flash memory 8 to sector/column address generation circuit 5.

Moreover, at the DMA transfer between main memory 1b and flash memory 8, DMA control circuit 4 outputs a pseudo memory address signal B 17 and a pseudo memory control signal B 20 to main memory 1b, and outputs an address corresponding to flash memory 8 to sector/column address generation circuit 5.

When the DMA transfer is terminated, DMA control circuit 4 outputs a DMA end signal 19 to I/O port 9. DMA control circuit 4 also outputs a bus switch state signal 23 indicating a bus switch state of bus switch circuits 2 and 3 to I/O port 9. CPU 104 reads DMA end signal 19 and bus switch state signal 23 from I/O port 9 via external buses 100 to 102, to learn the end of the DMA transfer and the bus switch state of bus switch circuits 2 and 3.

In FIG. 4, bus switch circuits 2 and 3 are used to connect main memory 1a to external buses 100 to 102, and to connect main memory 1b to S/P bus conversion circuit 6. In the initial state, CPU 104 can access main memory 1a, whereas DMA control circuit 4 can perform DMA transfer between main memory 1b and flash memory 8.

Moreover, if bus switch circuit 2 opens a terminal a and connects a terminal b to a terminal c by bus switch signal A 13 and if bus switch circuit 3 opens terminal a and connects terminal b to terminal c by bus switch signal B 12, main memory 1a is connected to S/P bus conversion circuit 6, whereas main memory 1b is connected to external buses 100 to 102. Such a state allows CPU 104 to access main memory 1b, and DMA control circuit 4 to perform DMA transfer between main memory 1a and flash memory 8.

In addition, if bus switch circuit 2 connects both terminals a and b to terminal c by bus switch signal A 13 and if bus switch circuit 3 connects terminal c to a terminal no by bus switch signal B 12, both main memories 1a and 1b are connected to external buses 100 to 102. Such a state allows CPU 104 to access both main memories 1a and 1b, so that a memory capacity corresponding to an addition of main memories 1a and 1b can be obtained.

Flash memory 8 operates in response to a serial clock signal 16 output from clock frequency-division circuit 107, a control signal 17 output from sector/column address generation circuit 5 and an address/data input/output signal 18. The operation is commonly known, so that detailed description thereof is omitted.

Clock generation circuit 106 generates and outputs an operation clock used by CPU 104. Clock frequency-division circuit 107 divides the frequency of a clock signal output from clock generation circuit 106 to generate serial clock signal 16 and a DMA clock signal 109.

CPU 104 includes an IPL (Initial Program Loader) 25 and starts a process by executing IPL 25 immediately after resetting. IPL 25 may be stored in ROM 108.

Figure 5:
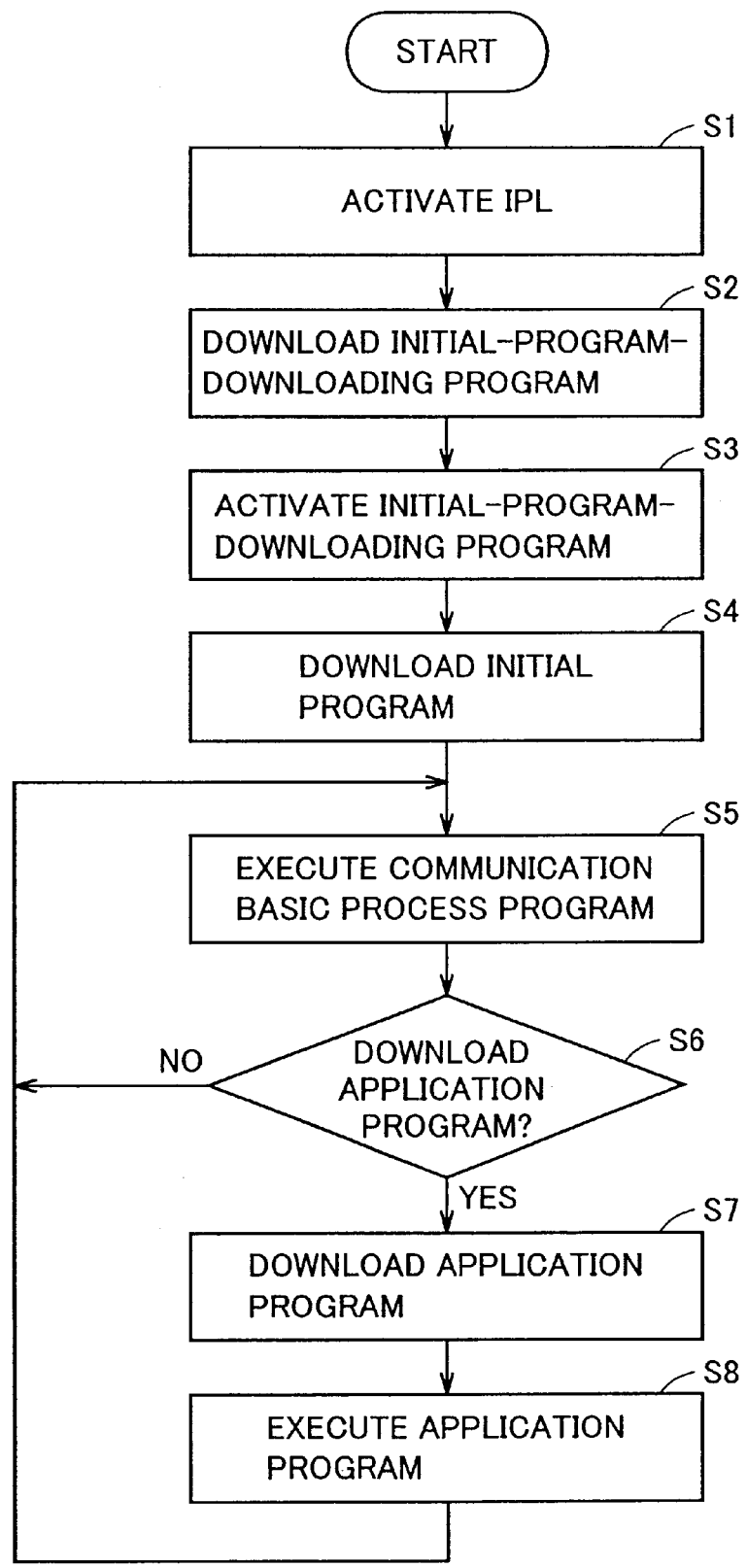
FIG. 5 is a flowchart for illustrating a process procedure of the memory system in the portable telephone according to the first embodiment of the present invention.

FIG. 5 is a flowchart for illustrating a process procedure of the memory system in the portable telephone according to the first embodiment of the present invention. First, when power is applied to CPU 104 to start execution of IPL 25 (S1), downloading of a download program for an initial program (hereinafter also referred to as "initial-program-downloading program") is commenced (S2).

Figure 6:
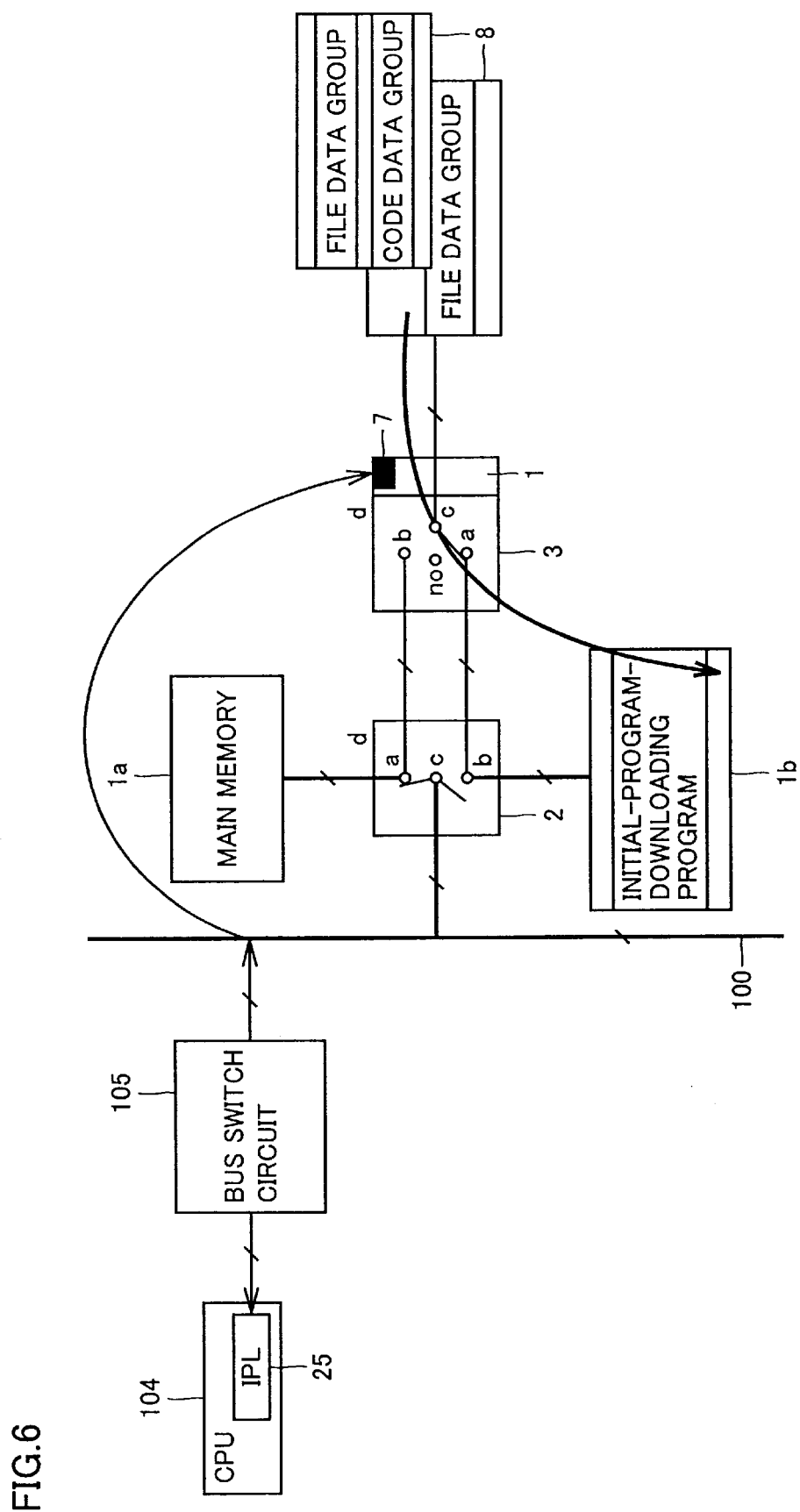
FIG. 6 illustrates data flow generated when CPU 104 executes IPL 25.

FIG. 6 illustrates data flow generated when CPU 104 executes IPL 25. When CPU 104 starts execution of IPL 25, it issues a command to control signal generation circuit 7 via bus switch circuit 105 and external buses 100 to 102, to provide an instruction for DMA transfer of the initial-program-downloading program stored in flash memory 8 to main memory 1b.

When control signal generation circuit 7 receives the command from CPU 104, it outputs bus switch signal A 13 to bus switch circuit 2, bus switch signal B 12 to bus switch circuit 3, and DMA control signal 14 to DMA control circuit 4. Bus switch circuit 2 connects terminal c to terminal a in response to bus switch signal A 13. Bus switch circuit 3 connects terminal c to terminal a in response to bus switch signal B 12.

When DMA control circuit 4 receives DMA control signal 14 from control signal generation circuit 7, it outputs pseudo memory address signal B 17 and pseudo memory control signal B 20 to main memory 1b in order to perform DMA transfer of the initial-program-downloading program from flash memory 8 to main memory 1b, and outputs parameters such as a header address, an address counter, the number of transferred sectors (or the number of bytes) of the DMA transfer to sector/column address generation circuit 5 and S/P bus conversion circuit 6.

When sector/column address generation circuit 5 receives the parameters from DMA control circuit 4, it generates a sector/column address and outputs the address to flash memory 8 to read out the initial-program-downloading program. S/P bus conversion circuit 6 converts serial data read from flash memory 8 into parallel data and outputs the parallel data to main memory 1b.

While DMA end signal 19 output from DMA control circuit 4 is connected to I/O port 9 for CPU 104 to read the state of DMA end signal 19, DMA end signal 19 may also be output to CPU 104 as an interrupt signal.

CPU 104 monitors DMA end signal 19 via I/O port 9 by executing IPL 25, and outputs a command to control signal generation circuit 7 if it detects the end of the DMA transfer. When control signal generation circuit 7 receives the command from CPU 104, it outputs bus switch signal B 12 and opens terminal a of bus switch circuit 3 to connect terminal c to terminal no (open terminal), while outputting bus switch signal A 13 and opening terminal a of bus switch circuit 2 to connect terminal c to terminal b.

Next, CPU 104 jumps to the header address of the initial-program-downloading program to activate the initial-program-downloading program (S3), to start downloading of the initial program (S4).

Figure 7:
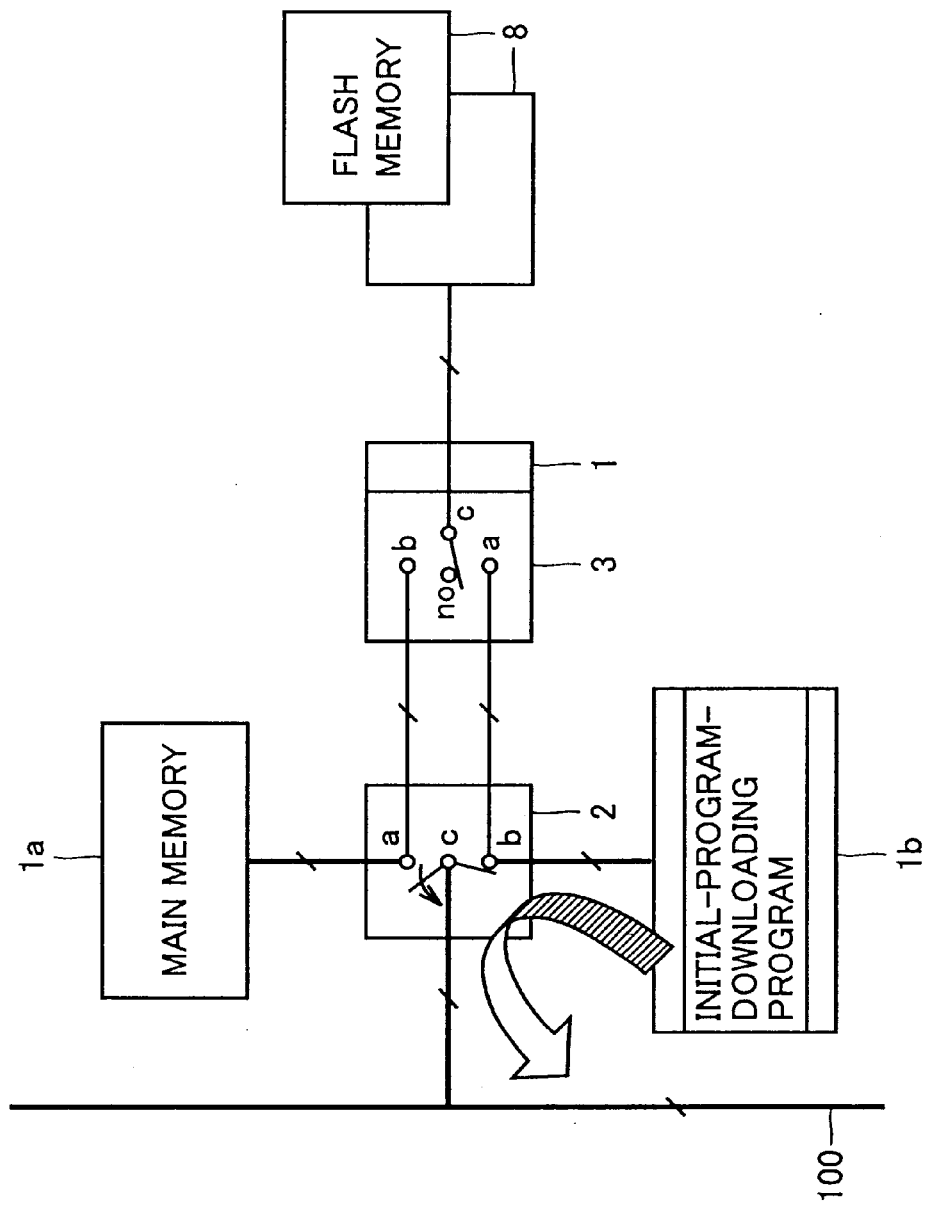
FIG. 7 illustrates data flow generated when CPU 104 executes an initial-program-downloading program downloaded to a main memory 1b.

FIG. 7 illustrates data flow generated when CPU 104 executes the initial-program-downloading program downloaded to main memory 1b. As described above, terminal b of bus switch circuit 2 is connected to terminal c, whereas main memory 1b is connected to external buses 100 to 102, so that CPU 104 reads out the initial-program-downloading program stored in main memory 1b and commences execution thereof.

It is assumed in the present embodiment that file data performing a basic process of communication is downloaded as an initial program among various file data stored in flash memory 8. The programs required for the basic process of communication are as follows.

Figure 8:
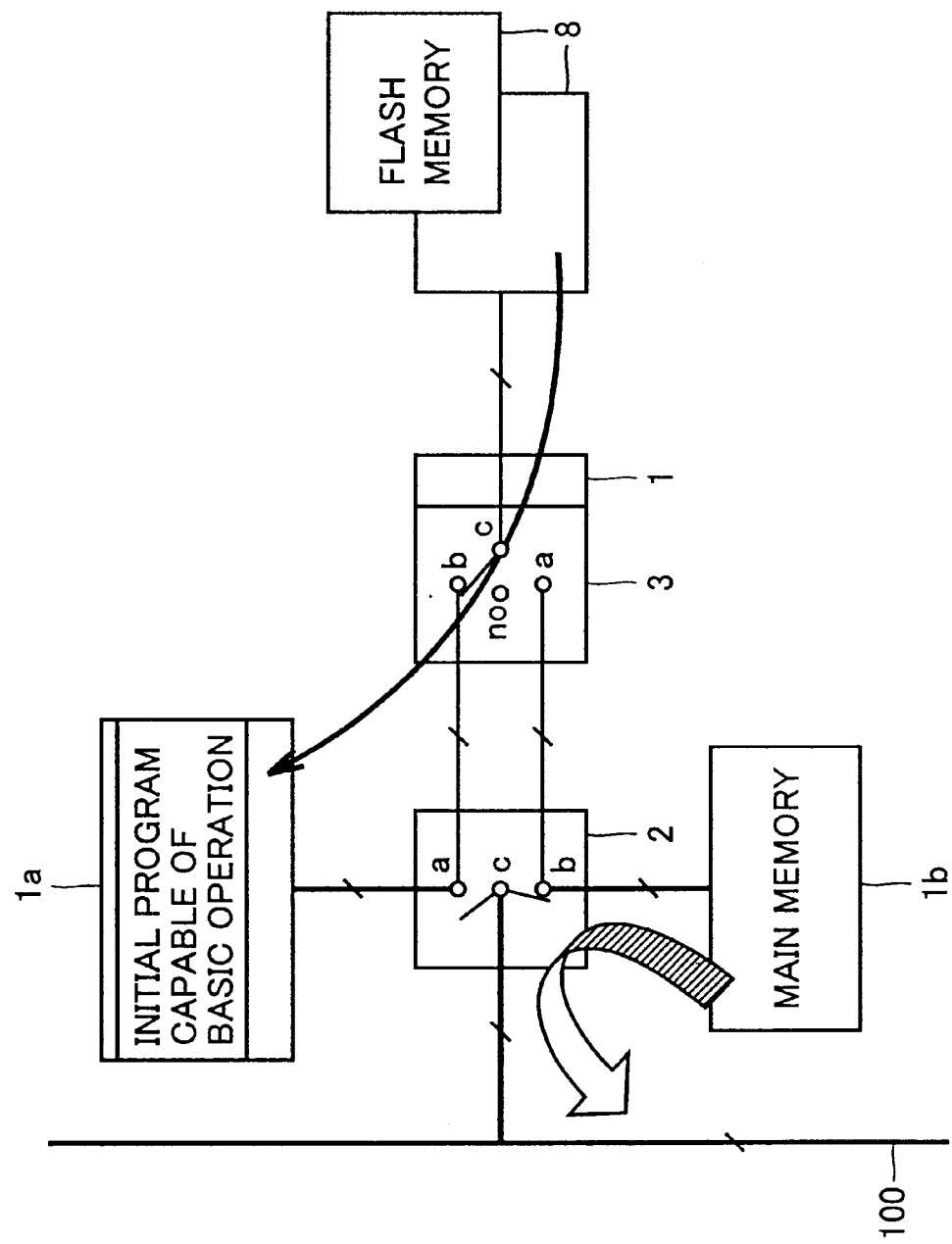
FIG. 8 illustrates data flow generated when CPU 104 downloads a program required for a basic process of communication.

(1) OS (Operating System) and file management software
(2) Flash memory driver software
(3) File management table
(4) Communication basic process program FIG. 8 illustrates data flow generated when CPU 104 downloads the programs required for the basic process of communication. When CPU 104 starts execution of the initial-program-downloading program, it issues a command to control signal generation circuit 7 via bus switch circuit 105 and external buses 100 to 102, to provide an instruction for DMA transfer of the OS and file management software stored in flash memory 8 to main memory 1a.

When control signal generation circuit 7 receives the command from CPU 104, it outputs bus switch signal A 13 to bus switch circuit 2, bus switch signal B 12 to bus switch circuit 3, and DMA control signal 14 to DMA control circuit 4.

When DMA control circuit 4 receives DMA control signal 14 from control signal generation circuit 7, it outputs pseudo memory address signal A 21 and pseudo memory control signal A 22 to main memory 1a, and outputs parameters such as a header address, an address counter, the number of transferred sectors (or the number of bytes) of the DMA transfer to sector/column address generation circuit 5 and S/P bus conversion circuit 6, in order to perform DMA transfer of the programs required for the basic process of communication from flash memory 8 to main memory 1a.

When sector/column address generation circuit 5 receives the parameters from DMA control circuit 4, it generates a sector/column address and outputs the address to flash memory 8 to read out the OS and file management software. S/P bus conversion circuit 6 converts the serial data read from flash memory 8 into parallel data and outputs the parallel data to main memory 1a.

CPU 104 monitors DMA end signal 19 via I/O port 9 by executing the initial-program-downloading program, and outputs a command to control signal generation circuit 7 if it detects the end of the DMA transfer, in order to download the next flash memory driver software. Subsequently, similar processes are repeated to download all the programs required for the basic process of communication to main memory 1a.

If CPU 104 confirms that the last communication basic process program has been downloaded, it starts execution of the communication basic process program (S5).

Figure 9:
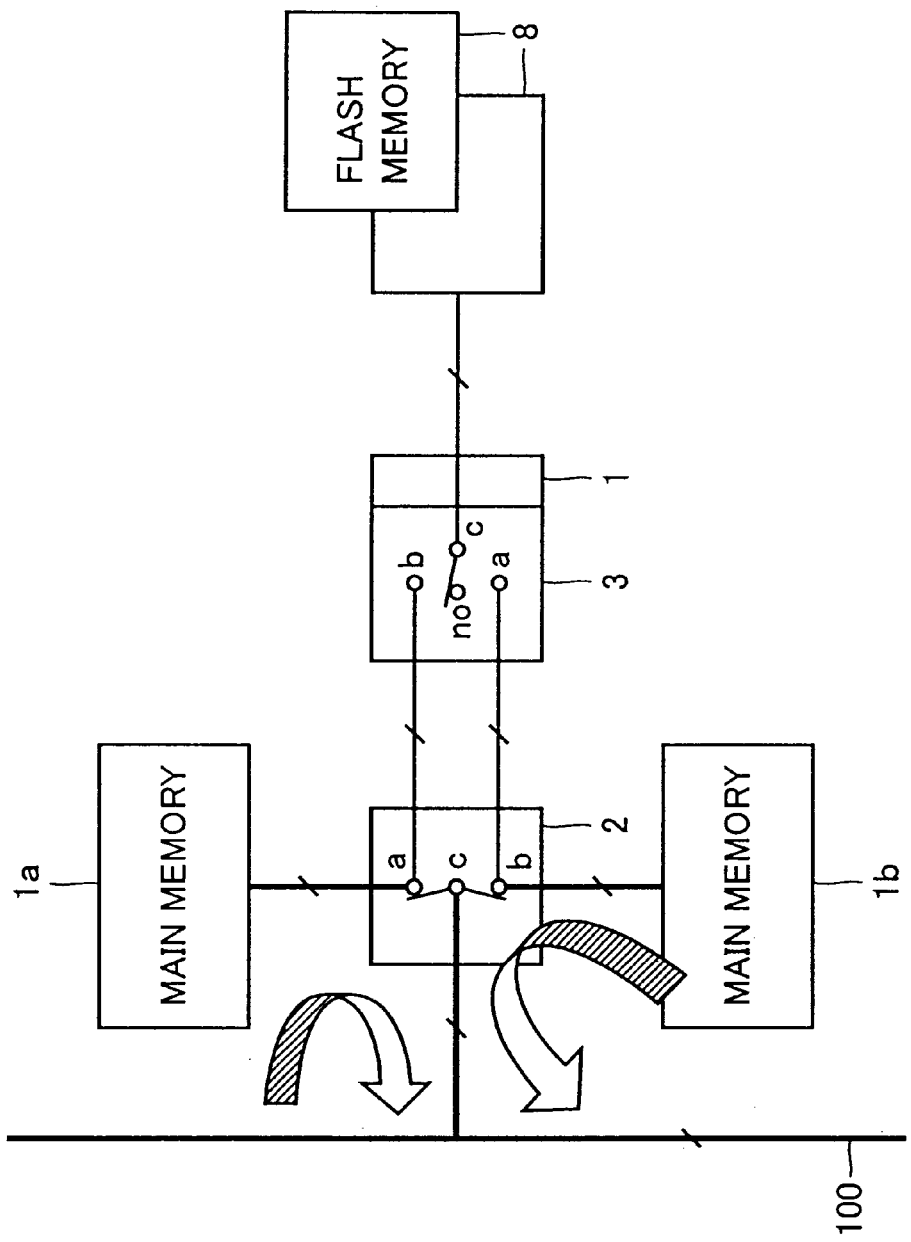
FIG. 9 illustrates data flow generated at execution of a communication process program.

FIG. 9 illustrates data flow generated when the communication process program is executed. When CPU 104 confirms the end of downloading of the communication basic process program, it issues a command to control signal generation circuit 7 to provide an instruction for switching of buses.

When control signal generation circuit 7 receives the command from CPU 104, it outputs bus switch signal A 13 to bus switch circuit 2, and bus switch signal B 12 to bus switch circuit 3. Bus switch circuit 2 connects both terminals a and b to terminal c in response to bus switch signal A 13. Bus switch circuit 3 connects terminal c to terminal no in response to bus switch signal B 12. Accordingly, CPU 104 can access both main memories 1a and 1b.

CPU 104 jumps to the OS to start processing of the communication basic process program.

Next, if it is predicted that an application program is used in the near future during execution of the communication basic process program (Yes at S6), CPU 104 downloads the application program in advance to main memory 1a or 1b (S7). Execution of the application program is started by, for example, operation by a user (S8).

CPU 104 reads out bus switch state signal 23 via I/O port 9 to identify a bus switch state. If the connection state of the bus is as shown in FIG. 9 and CPU 104 is currently executing the communication basic process program stored in main memory 1a, CPU 104 takes the application program into main memory 1b. That is, CPU 104 issues a command to control signal generation circuit 7 via bus switch circuit 105 and external buses 100 to 102, to provide an instruction for switching of buses.

When control signal generation circuit 7 receives the command from CPU 104, it outputs bus switch signal A 13 to bus switch circuit 2 and bus switch signal B 12 to bus switch circuit 3. Bus switch circuit 2 opens connection of terminal b in response to bus switch signal A 13. Bus switch circuit 3 opens terminal no to connect terminal c to terminal a in response to bus switch signal B 12.

CPU 104 then instructs control signal generation circuit 7 to download the application program stored in flash memory 8 to main memory 1b. When DMA control circuit 4 receives DMA control signal 14 from control signal generation circuit 7, it starts DMA transfer of the application program from flash memory 8 to main memory 1b.

When CPU 104 confirms the end of the DMA transfer of the application program, it issues a command to control signal generation circuit 7 via bus switch circuit 105 and external buses 100 to 102, to provide an instruction for switching of buses.

When control signal generation circuit 7 receives a command from CPU 104, it outputs bus switch signal A 13 to bus switch circuit 2, and bus switch signal B 12 to bus switch circuit 3. Bus switch circuit 2 connects a terminal c to both terminals a and b in response to bus switch signal A 13. Bus switch circuit 3 connects terminal no to terminal c in response to bus switch signal B 12.

Thus, an application program can be taken in main memory 1b in advance even if CPU 104 is executing a program in main memory 1a.

Figure 10:
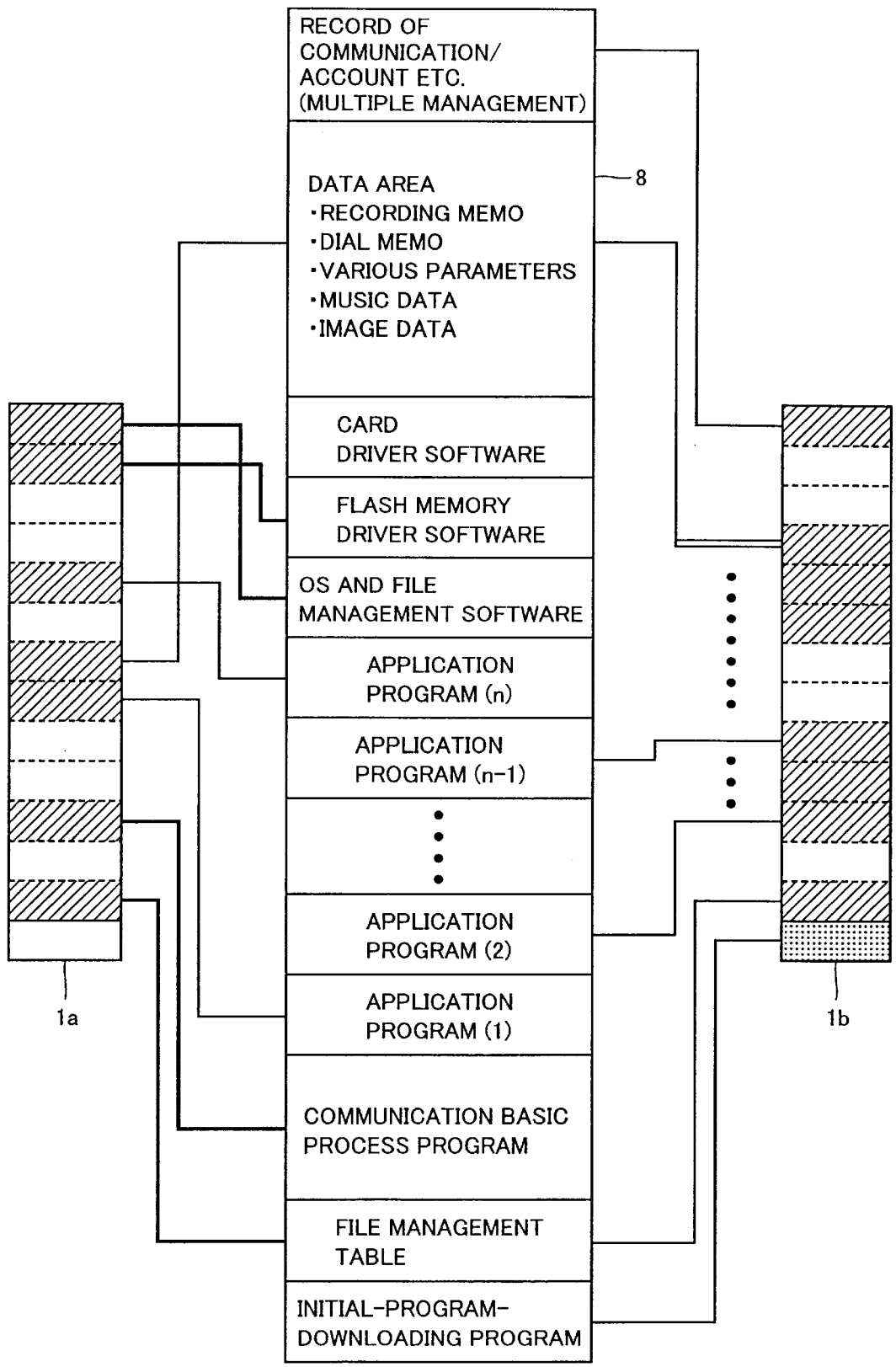
FIG. 10 shows file data stored into flash memory 8 being downloaded into main memories 1a and 1b.

FIG. 10 illustrates the file data stored in flash memory 8 being downloaded to main memories 1a and 1b. A flash memory driver software, an OS, a file management software, a file management table, a communication basic process program, an application program (1) and the like that are stored in flash memory 8 are downloaded to main memory 1a.

Further, an initial-program-downloading program, a file management table, an application program (2), a data area such as a recording memo or a dial memo, and a record of communication/account and the like that are stored in flash memory 8 are downloaded to main memory 1b.

It is noted that examples of the application program include a mail-related software, a music-related software, and an image-related software for a digital camera.

Figure 11:
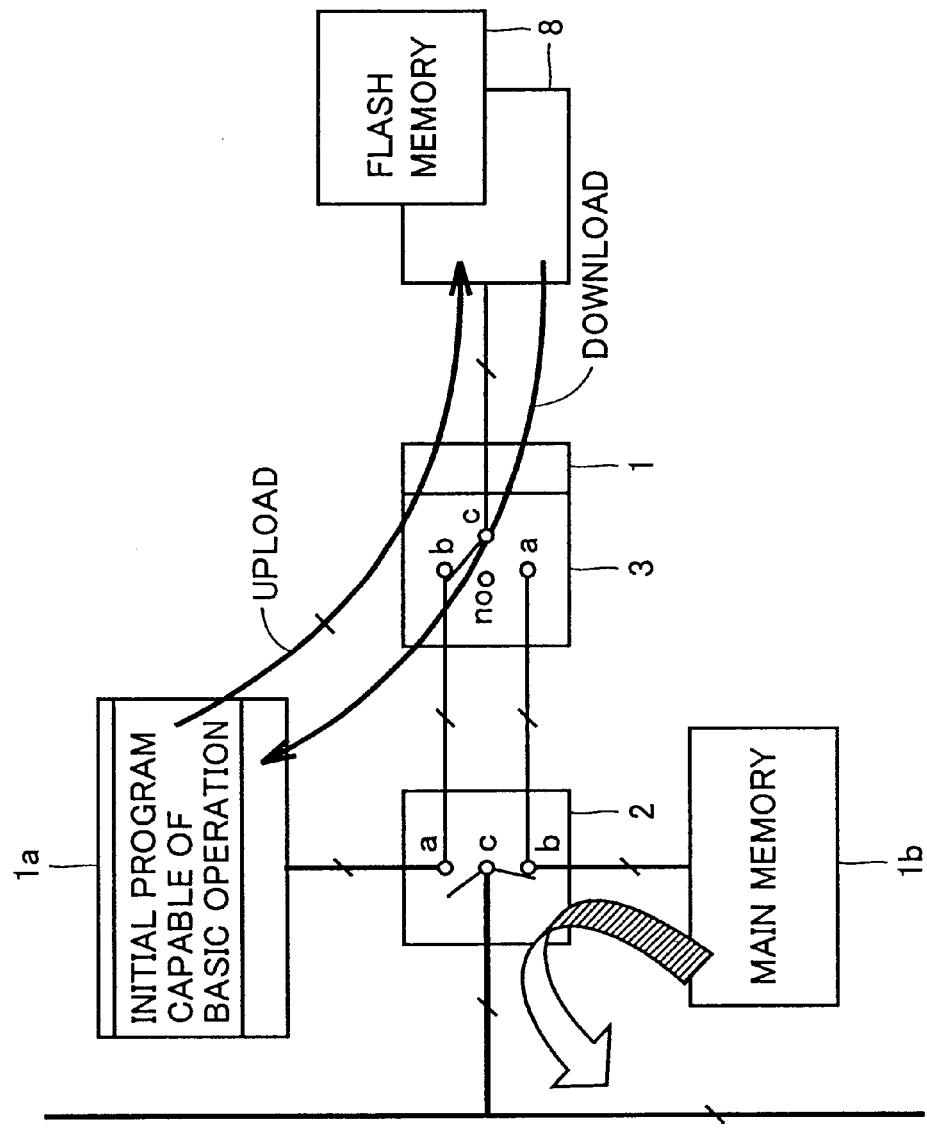
FIG. 11 illustrates bidirectional DMA transfer by a DMA control circuit 4.

FIG. 11 illustrates bidirectional DMA transfer by DMA control circuit 4. While FIG. 8 shows that file data is transferred (downloaded) by DMA from flash memory 8 to main memory 1a, the file data may also be transferred (uploaded) by DMA from main memory 1a to flash memory 8 as shown in FIG. 11. Here, a command indicating DMA transfer of the file data from main memory 1a to flash memory 8 is issued from CPU 104 to control signal generation circuit 7.

While SRAM (Static Random Access Memory), a pseudo SRAM, DRAM and the like are used as main memories 1a and 1b in the present embodiment, a high-speed non-volatile memory such as an MRAM (Magnetic Random Access Memory), an FeRAM (Ferroelectric Random Access Memory) and an OUM (Ovonics Unified Memory) may also be used.

Moreover, main memories 1a, 1b, control circuit 1 and I/O port 9 that are connected to external buses 100 to 102 may be integrated into CPU 104, while using an interface bus of flash memory 8 for connection to the outside.

Further, though control circuit 1, main memories 1a and 1b, and I/O port 9 are connected to external buses 100 to 102, they may also be connected to internal bus 103.

In addition, though the memory system in a portable telephone was described in the present embodiment, the memory system may also be applied to an electronic device requiring a memory with a large capacity used for e.g. processing of static/moving images.

As has been described above, according to the memory system in the first embodiment of the present invention, a two-line system with main memories 1a and 1b is employed to allow downloading of file data from flash memory 8 to a main memory currently not accessed by CPU 104, so that an AND-type or NAND-type flash memory of a low price may be connected without reduction in the processing speed of the system. Thus, the memory capacity of the portable telephone can be increased.

Moreover, required file data is transferred by DMA from flash memory 8 to main memory 1a or 1b in order. This allows reduction of the capacity of expensive main memories 1a and 1b and lowering of the price of the memory system.

In addition, the file data of flash memory 8 is transferred by DMA to a main memory not accessed by CPU 104, preventing overhead of the memory system.

Furthermore, DMA control circuit 4 allows bidirectional DMA transfer, so that important data, parameters and the like generated by operation of the portable telephone can be stored into flash memory 8.

Moreover, programs such as an OS, a communication basic process program and an application are stored into non-volatile AND-type or NAND-type flash memory 8. Thus, even if a failure occurs, the portable telephone can easily recover its initial state.

Second Embodiment

Figure 12:
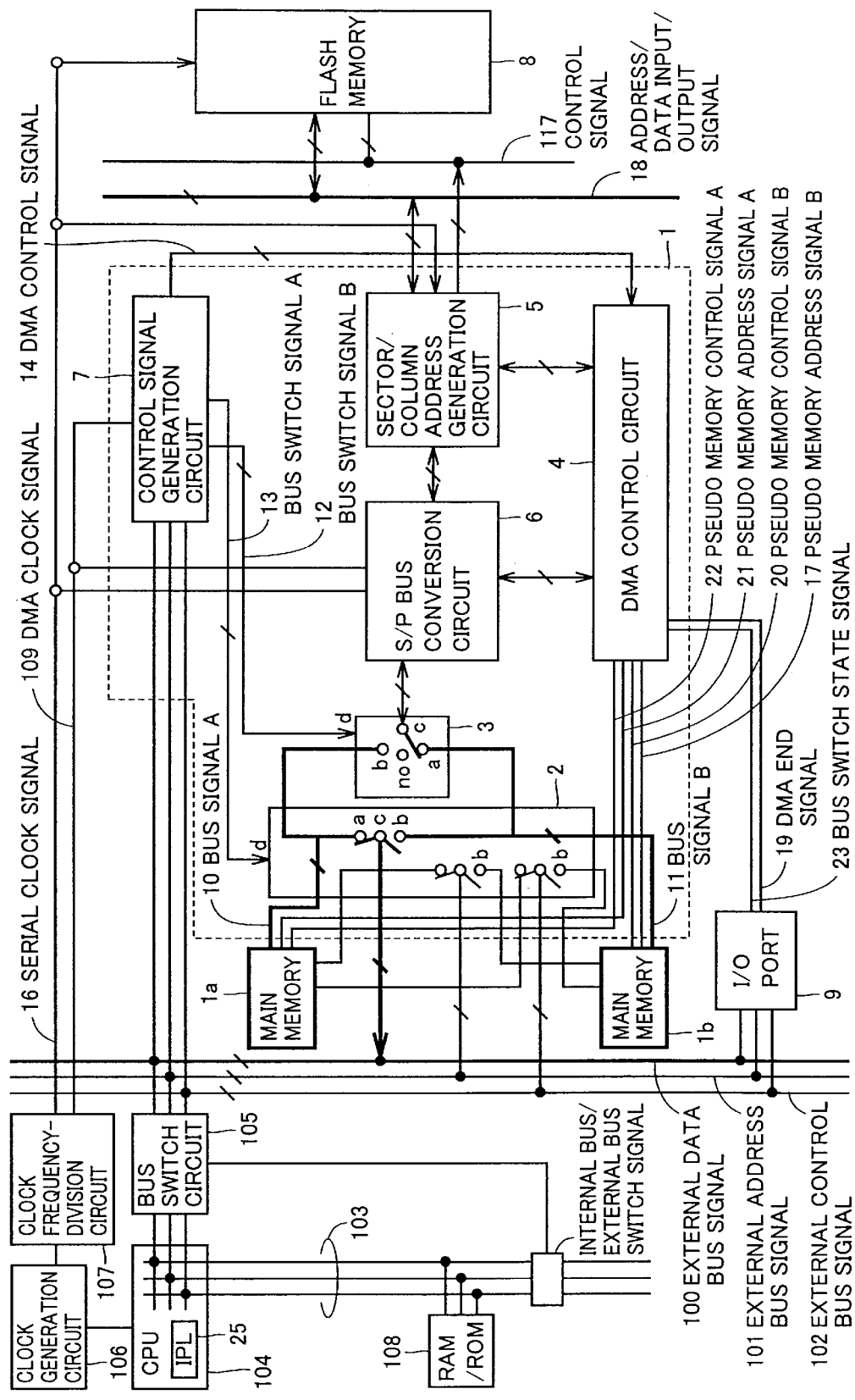
FIG. 12 is a block diagram showing a schematic configuration of a memory system according to the second embodiment of the present invention.

FIG. 12 is a block diagram showing a schematic configuration of a memory system according to the second embodiment of the present invention. The memory system according to the second embodiment is different from the memory system according to the first embodiment shown in FIG. 4 in that bus switch circuits 2 and 3, DMA control circuit 4, sector/column address generation circuit 5, S/P bus conversion circuit 6 and control signal generation circuit 7 are configured by one chip LSI 24 such as an ASIC (Application Specific Integrated Circuit) and a G/A (Gate Array). Thus, detailed description of overlapping structures and functions will not be repeated. Moreover, main memories 1a and 1b may be integrated into one chip LSI 24.

Furthermore, one chip LSI 24, main memory 1a and main memory 1b may be connected to internal bus 103 of CPU 104 to be integrated into CPU 104, while using the interface bus of flash memory 8 as a connection bus to the outside.

According to the memory system in the second embodiment of the present invention, an effect similar to that described in the first embodiment of the present invention can be obtained.

Third Embodiment

Figure 13:
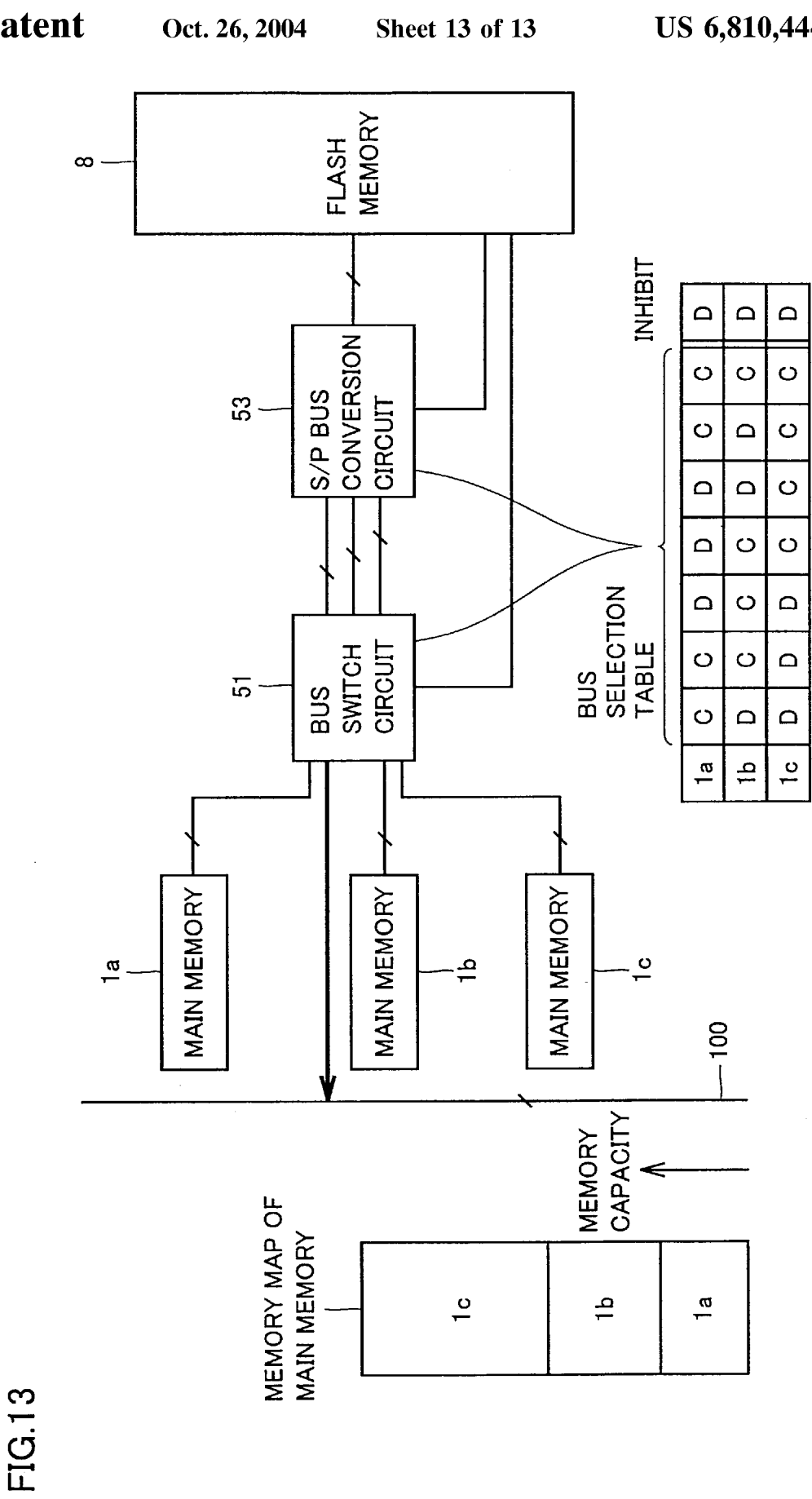
FIG. 13 is a block diagram showing a schematic configuration of a memory system according to the third embodiment of the present invention.

FIG. 13 is a block diagram showing a schematic configuration of a memory system according to the third embodiment of the present invention. The memory system according to the third embodiment is different from the memory system according to the first embodiment in FIG. 4 in that a three-line system with main memories 1a to 1c is employed and that a bus switch circuit has a different structure. Thus, detailed description of overlapping structures and functions will not be repeated.

Control signal generation circuit 7 controls a bus switch signal to change the connection state of bus switch circuits 51 and 52 as shown in a bus selection table in FIG. 13. In the bus selection table shown in FIG. 13, a main memory indicated as "C (for "Connect")" are connected to external buses 100 to 102. Moreover, main memories indicated as "D (for "Disconnect")" are connected to S/P bus conversion circuit 6 to allow downloading from flash memory 8. It is inhibited to set all main memories 1a to 1c as "D."

If all main memories 1a to 1c are set as "C," CPU 104 can access any one of main memories 1a to 1c. The total memory capacity is obtained by an addition of memory capacities of main memories 1a to 1c as shown in the memory map on the left in FIG. 13.

As has been described above, according to the memory system in the present embodiment, such a system with more than three main memories can also attain an effect similar to that described in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory system, comprising:

a non-volatile memory;

a main memory connected to an external bus to which a processor is connected;

a transfer control portion controlling direct memory access transfer between said non-volatile memory and said main memory; and a bus conversion portion performing conversion between parallel data and serial data between said non-volatile memory and said main memory.

2. The memory system according to claim 1, wherein said main memory includes a plurality of main memories, said memory system further comprises a bus switch portion switching a bus such that a second main memory different from a first main memory is connected to said non-volatile memory via said bus conversion portion if said first main memory is connected to said external bus, and that said first main memory is connected to said non-volatile memory via said bus conversion portion if said second main memory is connected to said external bus.

3. The memory system according to claim 2, wherein said bus switch portion connects both said first main memory and said second main memory to said external bus, and disconnects both said first main memory and said second main memory from said bus conversion portion.

4. The memory system according to claim 2, further comprising a control signal generation portion connected to said external bus and interpreting a command received from said processor to control said transfer control portion and said bus switch portion.

5. The memory system according to claim 2, further comprising an output portion receiving a signal indicating a bus switch state by said bus switch portion and outputting the signal to said processor via said external bus.

6. The memory system according to claim 5, wherein said output portion receives a signal indicating that direct memory access transfer by said transfer control portion is terminated and outputting the signal to said processor via said external bus.

7. The memory system according to claim 4, wherein at least said transfer control portion, said bus conversion portion, said bus switch portion and said control signal generation portion are formed on one chip.

8. The memory system according to claim 7, wherein at least said one chip and said plurality of main memories are integrated into said processor.

* * * * *